(12) United States Patent
Kato et al.

(10) Patent No.: US 11,285,468 B2
(45) Date of Patent: *Mar. 29, 2022

(54) HONEYCOMB STRUCTURE

(71) Applicant: NGK INSULATORS, LTD., Nagoya (JP)

(72) Inventors: Yasushi Kato, Nagoya (JP); Takahiro Kondo, Nagoya (JP); Junki Matsuya, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 286 days.

This patent is subject to a terminal disclaimer.

(21) Appl. No.: 16/180,360

(22) Filed: Nov. 5, 2018

(65) Prior Publication Data

US 2019/0160456 A1 May 30, 2019

(30) Foreign Application Priority Data

Nov. 24, 2017 (JP) .............................. JP2017-225577
Oct. 17, 2018 (JP) .............................. JP2018-196101

(51) Int. Cl.
| | | |
|---|---|---|
| *B01J 35/04* | (2006.01) | |
| *B01D 53/94* | (2006.01) | |
| *F01N 3/28* | (2006.01) | |
| *C04B 38/00* | (2006.01) | |
| *C04B 111/00* | (2006.01) | |

(52) U.S. Cl.
CPC .......... *B01J 35/04* (2013.01); *B01D 53/9454* (2013.01); *C04B 38/0006* (2013.01); *F01N 3/2828* (2013.01); *C04B 2111/0081* (2013.01); *C04B 2111/00793* (2013.01); *F01N 2330/06* (2013.01); *F01N 2330/34* (2013.01); *F01N 2330/60* (2013.01)

(58) Field of Classification Search
None
See application file for complete search history.

(56) References Cited

U.S. PATENT DOCUMENTS

| | | | |
|---|---|---|---|
| 6,482,498 B1 * | 11/2002 | Kawasaki | ............ B01J 31/1616 422/177 |
| 2002/0192426 A1 | 12/2002 | Ichikawa et al. | |
| 2004/0177600 A1 | 9/2004 | Ichikawa et al. | |

FOREIGN PATENT DOCUMENTS

| | | |
|---|---|---|
| JP | 2004-270569 A1 | 9/2004 |
| JP | 2004-289925 A1 | 10/2004 |
| JP | 2010-227818 A1 | 10/2010 |
| JP | 2013184836 A * | 9/2013 |
| WO | 02/11884 A1 | 2/2002 |

OTHER PUBLICATIONS

Hirose et al., machine translation of JP 2013-184836 Abstract, Description and Claims, Sep. 19, 2013 (Year: 2013).*

* cited by examiner

*Primary Examiner* — Mary I Omori
(74) *Attorney, Agent, or Firm* — Burr & Brown, PLLC

(57) ABSTRACT

A honeycomb structure includes a honeycomb structure body having porous partition walls, wherein a value of a porosity of the partition wall in a partitioning wall portion between the two cells is defined as a porosity A, a value of a porosity of the partition wall in an intersecting portion that is a region connecting two or more wall portions is defined as a porosity B, a value of A/B obtained by dividing the porosity A by the porosity B is from 0.5 to 0.95, and the porosity A is from 10 to 40%.

3 Claims, 7 Drawing Sheets

HONEYCOMB STRUCTURE

The present application is an applications based on JP-2017-225577 filed on Nov. 24, 2017 and JP2018-196101 filed on Oct. 17, 2018 with Japan Patent Office, the entire contents of which are incorporated herein by reference.

BACKGROUND OF THE INVENTION

Field of the Invention

The present invention relates to a honeycomb structure, and more particularly, it relates to a honeycomb structure having an excellent thermal shock resistance.

Description of the Related Art

In recent years, consciousness to environmental problems has increased in the whole society, and in a technical field in which fuel is burnt to generate power, various technologies have been developed to remove toxic components such as nitrogen oxides from an exhaust gas generated during the burning of the fuel. For example, various technologies have been developed to remove the toxic components, such as nitrogen oxides, from the exhaust gas emitted from a car engine. During such removal of the toxic components in the exhaust gas, it is general to cause chemical reaction in the toxic component by use of a catalyst, thereby converting the component to another comparatively non-toxic component. Further, as a catalyst carrier onto which the catalyst for exhaust gas purification is to be loaded, a honeycomb structure has been used.

Heretofore, as these honeycomb structures, there have been suggested honeycomb structures each including a honeycomb structure body having porous partition walls defining a plurality of cells which extend from an inflow end face to an outflow end face and become through channels for a fluid (e.g., see Patent Documents 1 to 4).

[Patent Document 1] WO2002/011884
[Patent Document 2] JP-A-2004-270569
[Patent Document 3] JP-A-2004-289925
[Patent Document 4] JP-A-2010-227818

SUMMARY OF THE INVENTION

In Patent Document 1, a honeycomb structure is disclosed in which a thickness of partition walls in a circumferential portion is adjusted to be larger than that in a central portion in a cross section of the honeycomb structure which is perpendicular to an extending direction of cells. In Patent Document 1, it is explained that this honeycomb structure has disadvantages due to an increase of a pressure loss and a decrease of a thermal shock resistance, but can achieve a well-balanced harmony with advantages due to an improvement of an isostatic strength and high accuracies of a partition wall shape and a honeycomb structure outer shape.

Here, when the honeycomb structure is for use as, for example, a catalyst carrier for exhaust gas purification, the honeycomb structure may be used in a state where the structure is stored in a can member such as a metal case. Hereinafter, the storing of the honeycomb structure in a can member such as the metal case will be referred to as canning sometimes. The metal case may be referred to as a metal can. In the honeycomb structure described in Patent Document 1, a strength of the circumferential portion of the honeycomb structure improves, and hence it is predicted that the improvement has a constant effect on, for example, inhibition of damages on the circumferential portion during the above-mentioned canning or the like. However, in the honeycomb structure described in Patent Document 1, a configuration of the partition walls in the central portion of the cross section is not changed from that of a conventional honeycomb structure, and hence there has been the problem that the improvement cannot be a countermeasure to inhibit generation of cracks due to a thermal shock load.

In Patent Document 2, a honeycomb structure having a relation of $Pi<Po$ is described, where $Pi$ is a porosity of partition walls in a central portion of a cross section of the honeycomb structure which is vertical to an axial direction, and $Po$ is a porosity of partition walls in a circumferential portion of the above cross section. In this honeycomb structure, the porosity of the central portion is adjusted to be smaller than the porosity of the circumferential portion, so that a heat capacity of the central portion can increase. However, when the central portion is only focused, there has been the problem that anything is not resolved in that partition wall in a partitioning wall portion between two cells becomes a starting point of generation of cracks in a case where the cracks are generated by the thermal shock load.

In Patent Document 3, a honeycomb structure is disclosed in which a shape of cells is a substantially square, an intersecting portion of partition walls has an R-shape or a C-shape, a value of a ratio of a diagonal distance between the intersecting portions to an average thickness of the partition walls is 1.6 or more, and a rate of an open frontal area of the cells is 55% or more. In this honeycomb structure, there has been the problem that anything is not solved in that the partition wall in a partitioning wall portion between two cells become a starting point of generation of cracks, though the intersecting portion of the partition walls is strengthened.

In Patent Document 4, a honeycomb structure is disclosed in which a value of a ratio of an intersecting portion porosity and an intermediate portion porosity is from 0.5 to 0.95, where the intersecting portion porosity is the porosity in a partition wall intersecting portion including an intersecting region where partition walls intersect each other, and the intermediate portion porosity is the porosity in a partition wall intermediate portion. Also in this honeycomb structure, there has been the problem that anything is not solved in that the partition wall intermediate portion between adjacent partition wall intersecting portions becomes a starting point of generation of cracks, though the intersecting portion of the partition walls is strengthened. In particular, in the honeycomb structure described in Patent Document 4, when a thermal shock load is applied, a strength of a partition wall intermediate portion substantially partitioning two cells further decreases. Therefore, it is considered that when thermal shock of the whole honeycomb structure is taken into consideration, its thermal shock resistance is adversely affected.

The present invention has been developed in view of these problems of the conventional technologies. According to the present invention, a honeycomb structure having an excellent thermal shock resistance is provided.

According to the present invention, the following honeycomb structure is provided.

According to a first aspect of the present invention, a honeycomb structure is provided including a honeycomb structure body having porous partition walls arranged to surround a plurality of cells which extend from a first end face to a second end face and become through channels for a fluid, wherein a value of a porosity of the partition wall in a partitioning wall portion between the two cells is defined as a porosity A, a value of a porosity of the partition wall in an intersecting portion that is a region connecting two or more wall portions is defined as a porosity B, a value of A/B obtained by dividing the porosity A by the porosity B is from 0.5 to 0.95, and the porosity A is from 10 to 40%.

According to a second aspect of the present invention, the honeycomb structure according to the above first aspect is provided, wherein an arithmetic mean of the porosity A and the porosity B is from 15 to 45%.

According to a third aspect of the present invention, the honeycomb structure according to the above first or second aspect is provided, wherein a shape of the cells in a cross section of the honeycomb structure body which is perpendicular to an extending direction of the cells is quadrangular or hexagonal.

According to a fourth aspect of the present invention, the honeycomb structure according to any one of the above first to third aspects is provided, wherein a thickness of the partition walls is from 40 to 200 μm.

A honeycomb structure of the present invention has an excellent thermal shock resistance. That is, the honeycomb structure of the present invention is capable of effectively inhibiting generation of cracks due to a thermal shock, as compared with a conventional honeycomb structure having about the same degree of porosity. In particular, when a porosity of the partition walls is adjusted to 10 to 40% and a porosity B of the partition wall in an intersecting portion connecting two or more wall portions is appropriately decreased, the thermal shock resistance of the whole honeycomb structure can improve. Specifically, when the porosity of the partition walls is 40% or less, for example, a catalyst for exhaust gas purification is hard to penetrate into pores formed in the partition walls. Consequently, in a case where the conventional honeycomb structure is used as a catalyst carrier in strict thermal conditions, for example, directly under a car engine, cracks are generated in the wall portions of the partition walls in an early period, because a thickness of the wall portion of each partition wall is smaller than that of the intersecting portion of the partition wall. Furthermore, there are concerns that the cracks generated in the wall portions of the partition walls easily develop into larger cracks, and defects of the honeycomb structure become worse. Here, for example, when the thickness of the wall portion of the partition wall is increased, the thermal shock resistance of the honeycomb structure can improve, but when the thickness of the partition walls is increased, a pressure loss rise of the honeycomb structure might be caused. In the honeycomb structure of the present invention, a porosity A of the partition walls in the wall portions in which the cracks are more easily generated is adjusted to be relatively low, and the above-mentioned A/B is adjusted to 0.5 to 0.95, so that it is possible to effectively inhibit the generation of the cracks in both of the wall portion and the intersecting portion of the partition wall. Additionally, in a cross section of the honeycomb structure of the present invention which is perpendicular to an extending direction of the cells, it is not necessary to partially change the thickness of the partition walls or to partially change a cell shape, and hence secondary problem such as the pressure loss rise is hard to occur.

DESCRIPTION OF THE PREFERRED EMBODIMENTS

Hereinafter, embodiments of the present invention will be described. However, the present invention is not limited to the following embodiments. Therefore, it should be understood that changes, improvements and others are suitably addable to the following embodiments on the basis of ordinary knowledge of a person skilled in the art without departing from the gist of the present invention.

(1) Honeycomb Structure (First Embodiment)

Figure 1:
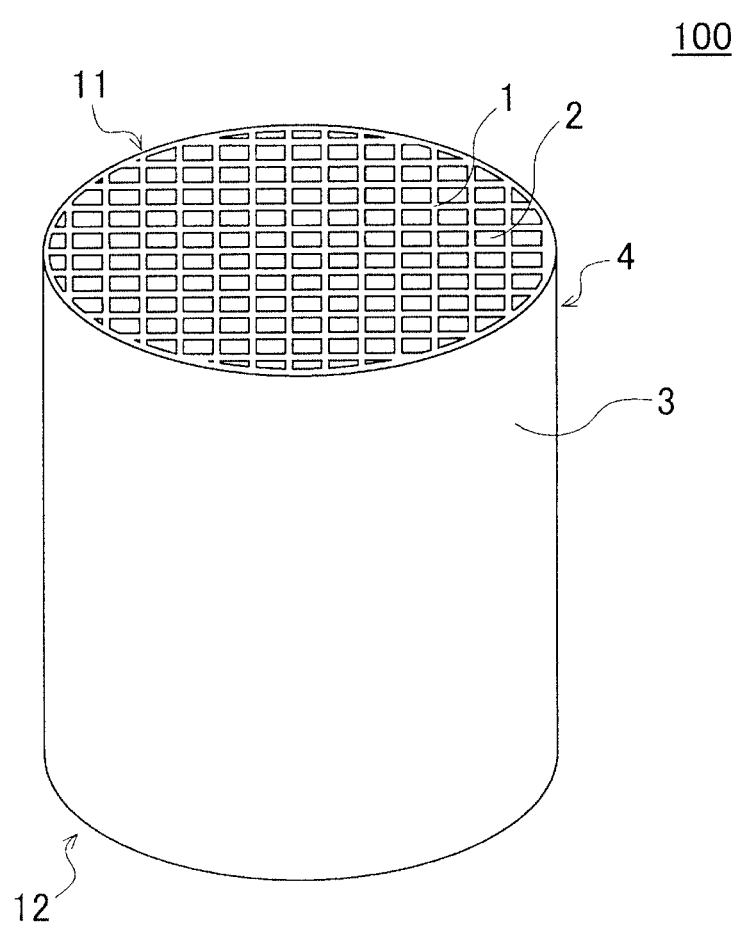
FIG. 1 is a perspective view schematically showing a first embodiment of a honeycomb structure of the present invention as seen from the side of a first end face.
Figure 2:
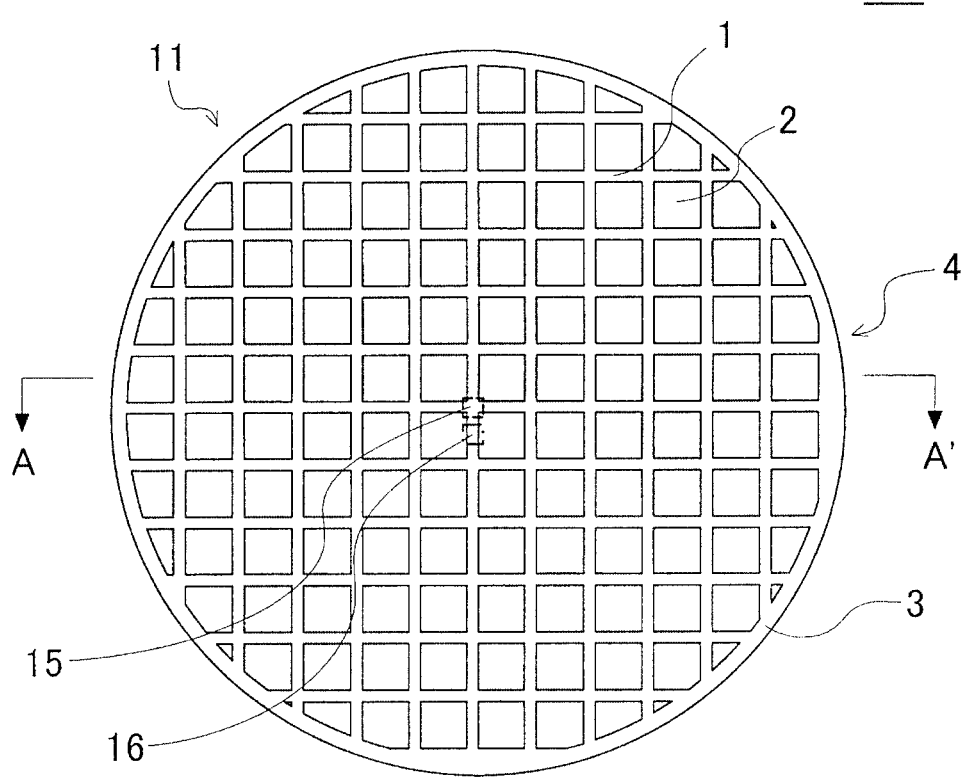
FIG. 2 is a plan view schematically showing the first end face of the honeycomb structure shown in FIG. 1.
Figure 3:
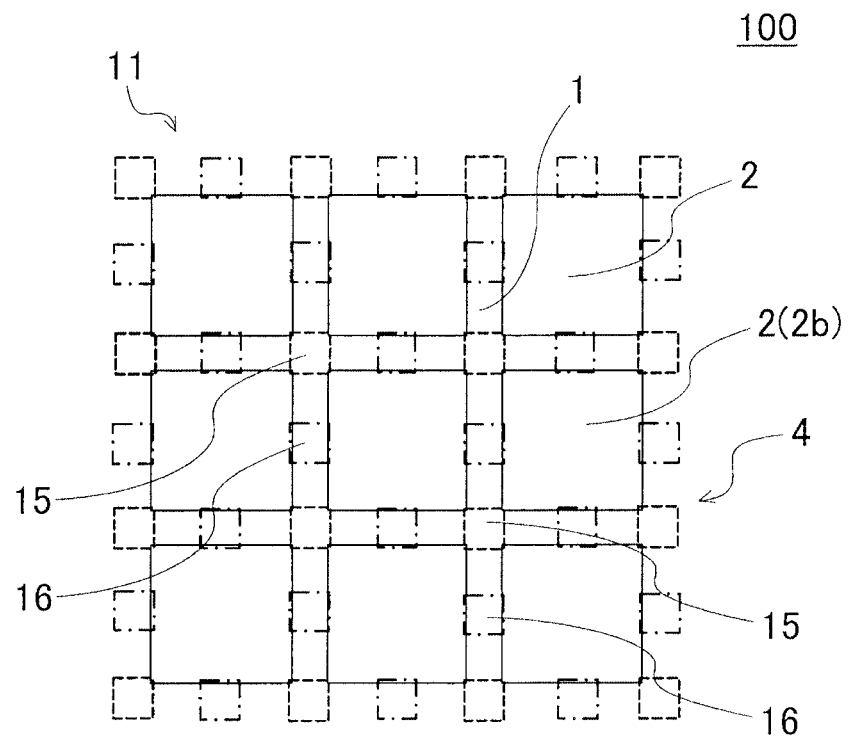
FIG. 3 is an enlarged plan view in which a part of the first end face of the honeycomb structure shown in FIG. 2 is enlarged.
Figure 4:
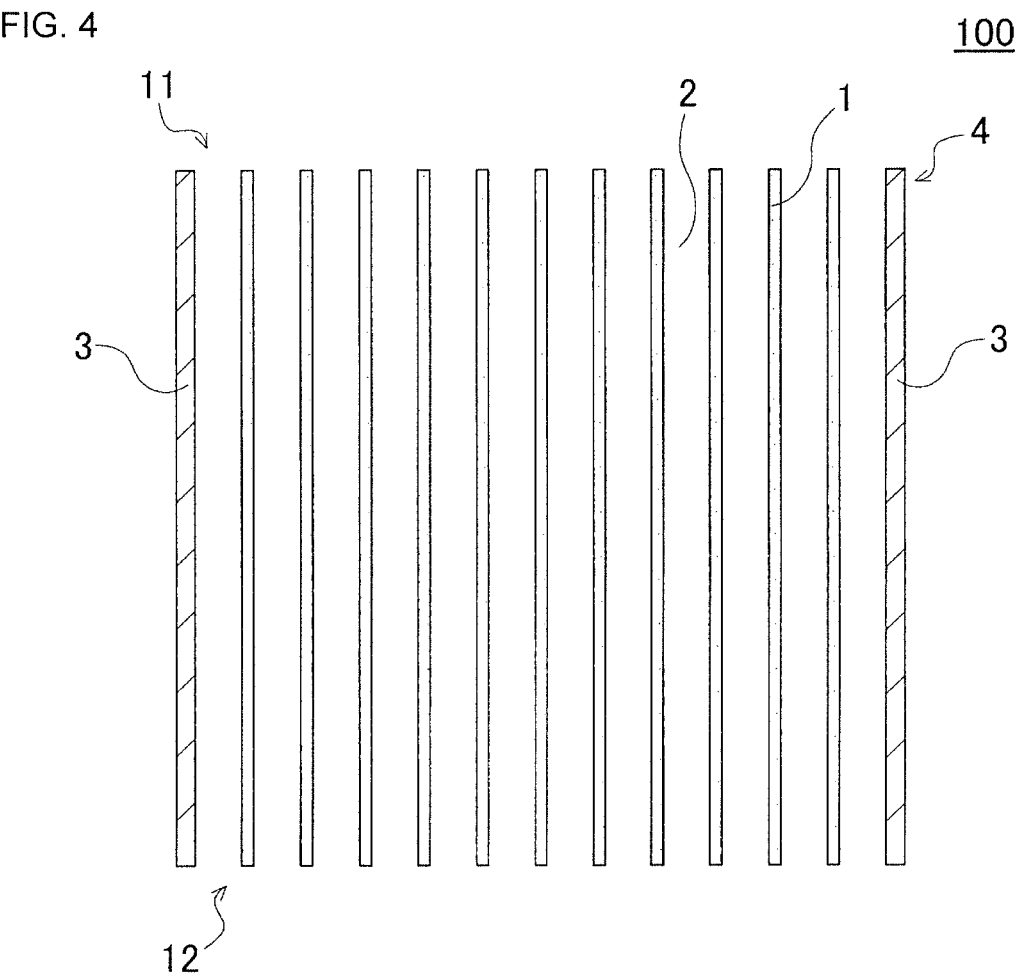
FIG. 4 is a cross-sectional view schematically showing a cross section taken along the A-A' line of FIG. 2.

As shown in FIG. 1 to FIG. 4, a first embodiment of a honeycomb structure of the present invention is a honeycomb structure 100 including a honeycomb structure body 4 having porous partition walls 1. Here, FIG. 1 is a perspective view schematically showing the first embodiment of the honeycomb structure of the present invention as seen from the side of a first end face. FIG. 2 is a plan view schematically showing the first end face of the honeycomb structure shown in FIG. 1. FIG. 3 is an enlarged plan view in which a part of the first end face of the honeycomb structure shown in FIG. 2 is enlarged. FIG. 4 is a cross-sectional view schematically showing a cross section taken along the A-A' line of FIG. 2.

The partition walls 1 of the honeycomb structure body 4 are arranged to surround a plurality of cells 2 which extend from a first end face 11 to a second end face 12 and become through channels for a fluid. That is, the plurality of cells 2 are defined by the porous partition walls 1. The honeycomb structure body 4 may further have, in its circumferential portion, a circumferential wall 3 is provided so as to surround the partition walls 1.

The honeycomb structure 100 of the present embodiment is suitably usable as a catalyst carrier onto which a catalyst for exhaust gas purification is to be loaded. The catalyst carrier is a porous structure which supports particulates of the catalyst. Therefore, each cell 2 formed in the honeycomb structure body 4 is not plugged with a plugging portion or the like at its open ends on the sides of the first end face 11 and the second end face 12, and the first end face 11 side communicates with the second end face 12 side through the respective cells 2.

As shown in FIG. 2 and FIG. 3, the honeycomb structure body 4 is characterized in that a porosity A of the partition wall 1 in a partitioning wall portion 16 between two cells 2 and a porosity B of the partition wall 1 in an intersecting portion 15 that is a region connecting two or more wall portions 16 indicate different values. More specifically, a value of the porosity of the partition wall 1 in the partitioning wall portion 16 between two cells 2 is defined as the porosity A. Furthermore, a value of the porosity of the partition wall 1 in the intersecting portion 15 connecting two or more wall portions 16 is defined as the porosity B. In this case, "the porosity A/the porosity B" that is a value obtained by dividing the porosity A by the porosity B is from 0.5 to 0.95. Hereinafter, "the porosity A/the porosity B" may simply be described as "A/B". Here, an example of "the intersecting portion 15 connecting two or more wall portions 16" is an intersecting portion of the partition walls 1 in a case where the partition walls 1 are configured in the form of lattices in a surface of the honeycomb structure body 4 which is perpendicular to an extending direction of the cells 2. Furthermore, for example, although omitted from the drawing, a region where two wall portions are connected to bend also becomes the intersecting portion connecting two or more wall portions. As shown in FIG. 2 and FIG. 3, the wall portion 16 and the intersecting portion 15 are elements which constitute the partition wall 1, and may suitably be referred to as, for example, "the wall portion 16 of the partition wall 1" and "the intersecting portion 15 of the partition wall 1".

The honeycomb structure 100 of the present embodiment has an excellent thermal shock resistance. That is, the honeycomb structure 100 of the present invention is capable of effectively inhibiting generation of cracks due to a thermal shock, as compared with a conventional honeycomb structure having about the same degree of porosity. In particular, when a porosity of the partition walls 1 is adjusted to 40% or less and the porosity B of the partition wall 1 in the intersecting portion 15 connecting two or more wall portions 16 is appropriately decreased, the thermal shock resistance of the whole honeycomb structure 100 can improve. Specifically, when the porosity of the partition walls 1 is 40% or less, for example, a catalyst for exhaust gas purification is hard to penetrate into pores formed in the partition walls 1. For example, in a case where the conventional honeycomb structure is used as the catalyst carrier in strict thermal conditions, for example, directly under a car engine, the cracks are generated in the wall portions of the partition walls in an early period, because a thickness of the wall portion of the partition wall is smaller than that of the intersecting portion of the partition wall. Furthermore, there are concerns that the cracks generated in the wall portions of the partition walls easily develop into larger cracks, and defects of the honeycomb structure become worse. Here, for example, when the thickness of the wall portion of the partition wall is increased, the thermal shock resistance of the honeycomb structure can improve, but when the thickness of the partition walls is increased, a pressure loss rise of the honeycomb structure might be caused. In the honeycomb structure 100 of the present embodiment, the porosity A of the partition walls 1 in the wall portions 16 in which the cracks are more easily generated is adjusted to be relatively low, and the above-mentioned A/B is adjusted to 0.5 to 0.95, so that it is possible to effectively inhibit the generation of the cracks in both of the wall portion 16 and the intersecting portion 15 of the partition wall 1. Additionally, in a cross section of the honeycomb structure 100 of the present embodiment which is perpendicular to an extending direction of the cells 2, it is not necessary to partially change the thickness of the partition walls 1 or to partially change a shape of the cells 2, and hence secondary problem such as the pressure loss rise is hard to occur.

Hereinafter, in the present description, a value of the porosity of the partition wall 1 in the partitioning wall portion 16 between two cells 2 may simply be referred to as "the porosity A". Furthermore, a value of the porosity of the partition wall 1 in the intersecting portion 15 connecting two or more wall portions 16 may simply be referred to as "the porosity B". "The partitioning wall portion 16 between two cells 2" is, for example, a portion constituting each side of a cross-sectional shape of each cell in a case where the cross-sectional shape of the two cells 2 is polygonal.

In the present invention, it is considered that each of the porosity A and the porosity B of the partition walls 1 is a value obtained by the following method. Firstly, a sample piece for which the porosity A and the porosity B are to be measured is cut out from the honeycomb structure 100. Respective regions from which the sample pieces are to be cut out are five regions on each of the first end face 11 side and the second end face 12 side of the honeycomb structure 100, i.e., ten regions in total. As to a region to be cut out in each end face, a central position of each end face is considered as a first cut-out region. Then, in each end face, four intermediate points between the central position and a circumferential edge of the honeycomb structure 100 on X-axis and Y-axis which pass this central position and are perpendicular to each other are considered as four residual cut-out regions.

The sample piece for which the porosity A is to be measured is cut out from each of the above-mentioned ten regions so as to include a central portion of the partitioning wall portion 16 between two cells 2. A length of one side of the sample piece for which the porosity A is to be measured is considered as a thickness of the wall portion 16 constituting the partition wall 1, a length of another side thereof is adjusted to 100 μm in an extending direction of the partition walls 1 in each end face, and a length of still another side thereof is adjusted to 20 mm in the extending direction of the cells 2.

The sample piece for which the porosity B is to be measured is cut out from each of the above-mentioned ten regions so as to include a central portion of the intersecting portion 15 of the partition wall 1. The sample piece for which the porosity B is to be measured is considered as an end face of a square in which a length of one side is adjusted to 100 μm, taking the central portion of the intersecting portion 15 connecting two or more wall portions 16 as its center, and a length of the sample piece in an axial direction is adjusted to 20 mm in the extending direction of the cells 2.

The sample piece cut out from the honeycomb structure 100 and prepared in this manner is embedded in epoxy resin to harden, and then its surface is polished. Then, each sample piece is cut outside as much as 5 mm in a total length direction, and its cut surface is considered as an observation surface with a scanning electron microscope (hereinafter referred to also as "SEM"). The SEM is an abbreviation for "the scanning electron microscope". As the scanning electron microscope, for example, a scanning electron microscope "model No.: S3200-N" manufactured by Hitachi High-Technologies Corporation is usable.

Afterward, the observation surface of the prepared sample piece is observed with the SEM, and an SEM image is acquired. During the measurement of the porosity A of the partition walls 1, the above SEM image is acquired as to the partition wall 1 in the observation surface of each of the above ten sample pieces. The SEM image is enlarged to 100 times and observed. Furthermore, during the measurement of the porosity B of the partition wall 1, the above SEM image is acquired as to the intersecting portion 15 of the partition walls 1 in each observation surface of the above ten sample pieces. Next, in each image, "an area S1 of the partition wall 1" and "an area S2 of a pore portion (a void portion)" are calculated by using an image analysis software. Then, the porosity of the imaged partition wall 1 of each image is calculated in accordance with "Formula (1): S2/(S1+S2)". As values of S1 and S2, average values of porosities of the respective ten regions are used.

As to the honeycomb structure 100 for which the porosity is to be measured, in a case where a catalyst for exhaust gas purification (not shown) is loaded onto the surfaces of the partition walls 1 and interiors of the pores of the partition walls 1, a portion onto which the catalyst is loaded is regarded as the pore portion of the partition wall 1, and the porosity is obtained. That is, in a method of measuring the above-mentioned porosity A and porosity B, after the SEM image is obtained, a region where it is judged from color information that the catalyst is present in the obtained SEM image is identified as the pore portion of the partition wall 1, and then its porosity is obtained.

When the value of A/B obtained by dividing the porosity A by the porosity B is less than 0.5, there are concerns that the cracks are likely to enter the intersecting portions 15 of the partition walls 1, and the cracks develop into continuous cracks of two or more regions sometimes. When the above A/B is in excess of 0.95, the cracks are also likely to enter the partition wall 1 in the wall portion 16 partitioning between two cells 2.

The value of A/B obtained by dividing the porosity A by the porosity B is preferably from 0.50 to 0.95 and further preferably from 0.55 to 0.90. According to such a constitution, it is possible to more effectively inhibit the generation of the cracks.

There are not any special restrictions on the value of the porosity B, but the value is preferably from 20 to 50% and further preferably from 20 to 45%. When the value of the porosity B is less than 20%, it might be hard to load the catalyst onto the partition walls 1. Furthermore, when the value of the porosity B is in excess of 50%, an isostatic strength of the honeycomb structure 100 might deteriorate.

An arithmetic mean of the porosity A and the porosity B is preferably from 15 to 45% and further preferably from 15 to 40%. When the arithmetic mean of the porosity A and the porosity B is less than 15%, it might be hard to load the catalyst onto the partition walls 1. Furthermore, when the arithmetic mean of the porosity A and the porosity B is in excess of 45%, the isostatic strength of the honeycomb structure 100 might deteriorate.

There are not any special restrictions on the shape of each cell 2 (hereinafter referred to simply as "the cell shape") in the cross section of the honeycomb structure body 4 which is perpendicular to the extending direction of the cells 2. For example, the shape of the cells 2 is preferably polygonal, and further preferably quadrangular or hexagonal. Furthermore, the shape of each cell 2 may be a shape obtained by forming corner portions of a polygon in a curved shape, for example, a substantially quadrangular shape obtained by forming corner portions of a quadrangle in a curved shape.

The thickness of the partition walls 1 is preferably from 40 to 200 μm, further preferably from 45 to 185 μm, and especially preferably from 50 to 170 μm. When the thickness of the partition walls 1 is less than 40 μm, the isostatic strength of the honeycomb structure 100 might deteriorate. When the thickness of the partition walls 1 is in excess of 200 μm, a pressure loss might increase, and an output drop of an engine or deterioration of fuel efficiency might be caused. The thickness of the partition wall 1 is a value measured by a method of observing, with an optical microscope, a cross section of the honeycomb structure 100 which is perpendicular to an axial direction.

There are not any special restrictions on an overall shape of the honeycomb structure 100. An example of the overall shape of the honeycomb structure 100 shown in FIG. 1 to FIG. 4 is a round pillar shape in which the first end face 11 and the second end face 12 are circular. Another example of the overall shape of the honeycomb structure 100 may be a pillar shape in which the first end face 11 and the second end face 12 have a substantially circular shape such as an elliptic shape, a racetrack shape, or an oblong shape. Alternatively, the overall shape of the honeycomb structure 100 may be a prismatic columnar shape in which the first end face 11 and the second end face 12 have a polygonal shape such as a quadrangular shape or a hexagonal shape.

There are not any special restrictions on a material constituting the partition walls 1, but from the viewpoints of a strength, a heat resistance, a durability and the like, it is preferable that a main component is any type of ceramics of an oxide or a non-oxide, a metal, or the like. Specifically, it is considered that examples of ceramics include cordierite, mullite, alumina, spinel, silicon carbide, silicon nitride, and aluminum titanate. It is considered that examples of the metal include a Fe—Cr—Al based metal and metal silicon. It is preferable to use, as the main component, at least one selected from the group consisting of these materials. From the viewpoints of a high strength, a high heat resistance and the like, it is especially preferable to use at least one selected from the group consisting of alumina, mullite, aluminum titanate, cordierite, silicon carbide and silicon nitride, as the main component. Furthermore, from the viewpoints of a high thermal conductivity, a high heat resistance and the like, silicon carbide or a silicon-silicon carbide composite material is especially suitable. Here, "the main component" means a component constituting 50 mass % or more of the partition walls 1. The above component is included in the material constituting the partition walls 1 as much as preferably 70 mass % or more and further preferably 80 mass % or more.

In the honeycomb structure 100 of the present embodiment, a catalyst for exhaust gas purification may be loaded onto at least one of each surface of the partition walls 1 of the honeycomb structure body 4 and each pore of the partition walls 1. According to this constitution, CO, $NO_x$, HC and the like in the exhaust gas can be converted to harmless substances by a catalytic reaction.

When the catalyst is loaded onto the honeycomb structure 100 of the present embodiment, it is preferable that the catalyst includes at least one selected from the group consisting of a three-way catalyst, an SCR catalyst, a $NO_x$ absorber catalyst and an oxidation catalyst. The three-way catalyst is referred to as a catalyst to mainly purify hydrocarbons (HC), carbon monoxides (CO) and nitrogen oxides ($NO_x$). An example of the three-way catalyst is a catalyst containing platinum (Pt), palladium (Pd) and rhodium (Rh). The SCR catalyst is a catalyst to selectively reduce components to be purified. In particular, it is preferable that the above-mentioned SCR catalyst is a $NO_x$ selectively reducing SCR catalyst to selectively reduce $NO_x$ in the exhaust gas. A preferable example of the $NO_x$ selectively reducing SCR catalyst is a catalyst to selectively reduce and purify $NO_x$ in the exhaust gas. Furthermore, an example of the SCR catalyst is a metal-substituted zeolite. Examples of a metal in the metal-substituted zeolite include iron (Fe) and copper (Cu). A suitable example of zeolite is a beta zeolite. Additionally, the SCR catalyst may be a catalyst containing, as a main component, at least one selected from the group consisting of vanadium and titania. Examples of the $NO_x$ absorber catalyst include an alkali metal and an alkali earth metal. Examples of the alkali metal include potassium, sodium, and lithium. An example of the alkali earth metal is calcium. An example of the oxidation catalyst is a catalyst containing a noble metal. Specifically, it is preferable that the oxidation catalyst contains at least one selected from the group consisting of platinum, vanadium and rhodium.

(2) Honeycomb Structure (Second Embodiment to Fourth Embodiment)

Figure 5:
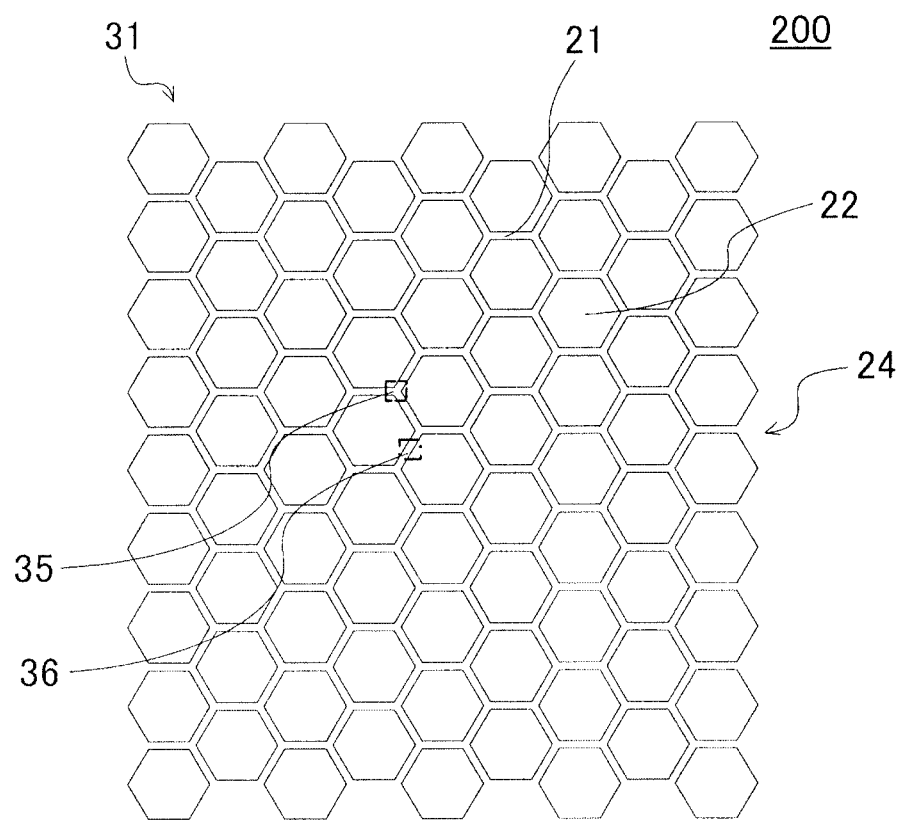
FIG. 5 is a plan view schematically showing a second embodiment of the honeycomb structure of the present invention and showing a part of its first end face.
Figure 6:
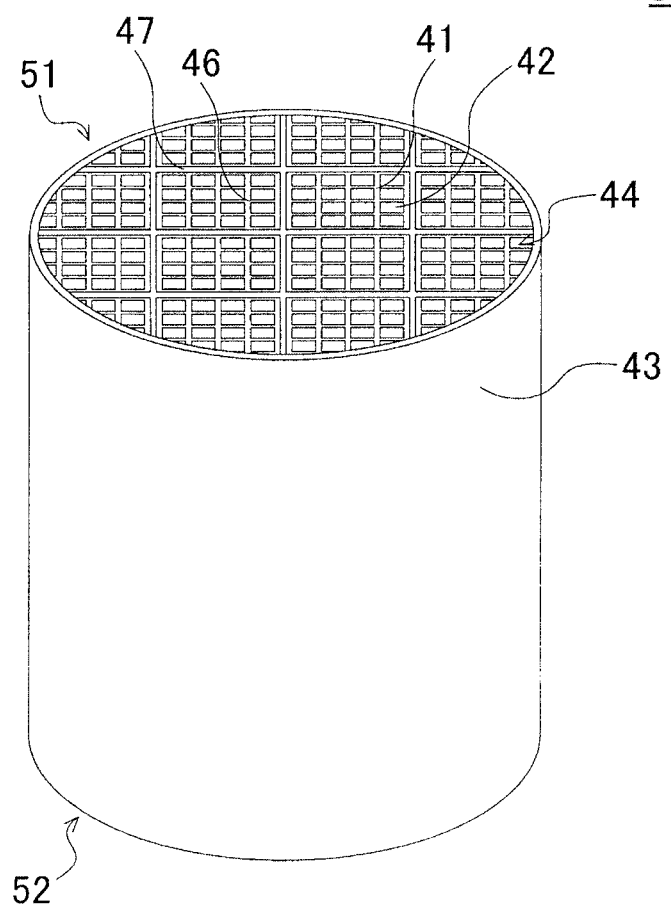
FIG. 6 is a perspective view schematically showing a third embodiment of the honeycomb structure of the present invention as seen from the side of a first end face.
Figure 7:
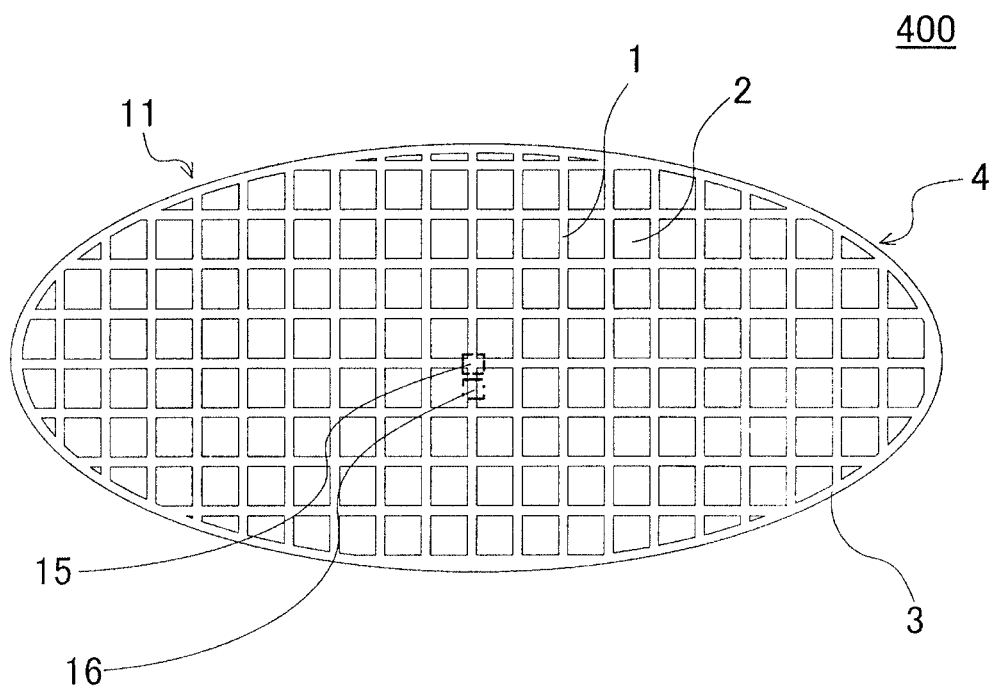
FIG. 7 is a plan view schematically showing a first end face of a fourth embodiment of the honeycomb structure of the present invention.

Next, a second embodiment to a fourth embodiment of the honeycomb structure of the present invention will be described with reference to FIG. 5 to FIG. 7. FIG. 5 is a plan view schematically showing the second embodiment of the honeycomb structure of the present invention and showing a part of its first end face. FIG. 6 is a perspective view schematically showing the third embodiment of the honeycomb structure of the present invention as seen from the side of a first end face. FIG. 7 is a plan view schematically showing a first end face of the fourth embodiment of the honeycomb structure of the present invention.

As shown in FIG. 5, the second embodiment of the honeycomb structure of the present invention is a honeycomb structure 200 including a honeycomb structure body 24 having porous partition walls 21. In the honeycomb structure 200 of the second embodiment, a shape of cells 22 is "a hexagon". Furthermore, when a value of a porosity of the partition wall 21 in a partitioning wall portion 36 between two cells 22 is defined as a porosity A and a value of a porosity of a partition wall 21 in an intersecting portion 35 connecting two or more wall portions 36 is defined as a porosity B, a value of A/B obtained by dividing the porosity A by the porosity B is from 0.5 to 0.95. The honeycomb structure 200 of the second embodiment having such a constitution can obtain technological effects similar to those of the honeycomb structure 100 of the hitherto described first embodiment (see FIG. 1 to FIG. 4). It is preferable that the honeycomb structure 200 of the second embodiment has a constitution similar to that of the honeycomb structure 100 of the first embodiment (see FIG. 1 to FIG. 4) except that the shape of the cells 22 is different. In FIG. 5, reference numeral 31 denotes a first end face of the honeycomb structure body 24.

As shown in FIG. 6, the third embodiment of the honeycomb structure of the present invention is a honeycomb structure 300 including a honeycomb structure body 44 of a segmented structure. That is, in the honeycomb structure 300, each honeycomb structure body 44 is constituted of pillar-shaped honeycomb segments 46, and side surfaces of a plurality of honeycomb segments 46 are bonded to one another by a bonding layer 47. In this way, in the honeycomb structure 300 of the present embodiment, each of the plurality of honeycomb segments 46 corresponds to the honeycomb structure body 44 of the honeycomb structure 300. Here, "the honeycomb structure of the segmented structure" is referred to as a honeycomb structure constituted by bonding the plurality of individually prepared honeycomb segments 46. It is to be noted that the honeycomb structure 100 in which all the partition walls 1 of the honeycomb structure body 4 are monolithically formed as shown in FIG. 1 to FIG. 4 may be referred to as "a monolithic honeycomb structure". The honeycomb structure of the present invention may be "the honeycomb structure of the segmented structure" or "the monolithic honeycomb structure".

In the honeycomb structure 300, it is preferable that at least one honeycomb segment 46 has a constitution similar to that of the honeycomb structure body of the hitherto described honeycomb structure of the first embodiment. Also, the honeycomb structure 300 can obtain technological effects similar to those of the hitherto described honeycomb structure of the first embodiment. The plurality of honeycomb segments 46 may have the same cell structure or may have different cell structures, respectively. In FIG. 6, reference numeral 51 denotes a first end face and reference numeral 52 denotes a second end face.

It is preferable that a circumferential wall 43 in the honeycomb structure 300 is a circumference coating layer formed by a circumference coating material. The circumference coating material is a coating material to be coated on a circumference of a bonded body obtained by bonding the plurality of honeycomb segments 46, thereby forming the circumference coating layer. Furthermore, it is preferable that the bonded body in which the plurality of honeycomb segments 46 are bonded is prepared by grinding a circumferential portion of the bonded body and providing the above-mentioned circumference coating layer thereon. Furthermore, also as to the monolithic honeycomb structure 100 shown in FIG. 1 to FIG. 4, a circumferential wall 3 disposed on a circumference of the honeycomb structure body 4 may be a circumference coating layer formed by a circumference coating material as described above.

In the honeycomb structure 300 shown in FIG. 6, shapes of the cells 42 are quadrangular. However, the shape of each cell 42 in each honeycomb segment 46 is not limited to the quadrangle, and the shape of the cells in the hitherto described honeycomb structure of the second embodiment is employable.

As shown in FIG. 7, the fourth embodiment of the honeycomb structure of the present invention is a honeycomb structure 400 including a honeycomb structure body 4 a cross-sectional shape of which is elliptic. Therefore, in the honeycomb structure 400, an overall shape of the honeycomb structure 400 is a pillar shape each end face of which is elliptic. It is preferable that the honeycomb structure 400 of the fourth embodiment has a constitution similar to that of the honeycomb structure 100 of the first embodiment (see FIG. 1 to FIG. 4) except that the overall shape of the honeycomb structure 400 is different.

In the honeycomb structure 400 shown in FIG. 7, a shape of cells 2 is quadrangular. However, the shape of the cells 2 is not restricted to the quadrangle.

(3) Manufacturing Method of Honeycomb Structure

Next, a method of manufacturing the honeycomb structure of the present invention will be described. An example of the manufacturing method of the honeycomb structure of the present invention is a method including a step of preparing a honeycomb formed body, and a step of drying and firing the obtained honeycomb formed body.

(3-1) Forming Step

The forming step is a step of extruding a kneaded material obtained by kneading a forming raw material into a honeycomb shape to obtain the honeycomb formed body. The honeycomb formed body has partition walls defining cells extending from a first end face to a second end face, and a circumferential wall formed so as to surround an outermost circumference of the partition walls. A part of a honeycomb structure constituted of the partition walls corresponds to a honeycomb structure body. In the forming step, the forming raw material is initially kneaded to obtain the kneaded material. Next, the obtained kneaded material is extruded, thereby obtaining the honeycomb formed body in which the partition walls and the circumferential wall are monolithically formed.

It is preferable that the forming raw material is a ceramic raw material to which a dispersing medium and an additive are added. Examples of the additive include an organic binder, a pore former, and a surfactant. An example of the dispersing medium is water. As the forming raw material, there is usable a material similar to a forming raw material used in a heretofore known honeycomb structure manufacturing method.

An example of a method of kneading the forming raw material to form the kneaded material is a method in which a kneader, a vacuum pugmill or the like is used.

The extrusion can be performed by using an extruding die in which slits corresponding to a cross-sectional shape of the honeycomb formed body are formed. For example, as the extruding die, it is preferable to use a die in which there are formed slits corresponding to the shape of the cells in each of the hitherto described honeycomb structures of the first embodiment to the fourth embodiment.

Here, in the extrusion, it is preferable to raise an extrusion speed and heighten an extrusion pressure during the formation. Thus, the extrusion is performed by this method, so that "the partition wall in the partitioning wall portion between two cells" can be densified more than the partition wall in the intersecting portion. That is, in the obtained honeycomb structure, "the porosity B of the partition wall in the intersecting portion" can relatively be increased. In consequence, the value of A/B obtained by dividing the porosity A of the partition wall in the wall portion by the porosity B of the partition wall in the intersecting portion can be adjusted to a numeric range of 0.5 to 0.95.

(3-2) Firing Step

The firing step is a step of firing the honeycomb formed body obtained by the forming step, to obtain the honeycomb structure. The obtained honeycomb formed body may be dried with, for example, microwaves and hot air, before the honeycomb formed body is fired.

A firing temperature in firing the honeycomb formed body can suitably be determined in accordance with a material of the honeycomb formed body. For example, when the material of the honeycomb formed body is cordierite, the firing temperature is preferably from 1380 to 1450° C. and further preferably from 1400 to 1440° C. Furthermore, it is preferable that a firing time is from about 4 to 6 hours as a time to keep the highest temperature.

EXAMPLES

Hereinafter, the present invention will further specifically be described in accordance with examples, but the present invention is not limited to these examples.

Example 1

To 100 parts by mass of cordierite forming raw material, 0.5 parts by mass of a pore former, 33 parts by mass of a dispersing medium and 5.6 parts by mass of an organic binder were added, mixed and kneaded to prepare a kneaded material. As the cordierite forming raw material, alumina, aluminum hydroxide, kaolin, talc and silica were used. Water was used as the dispersing medium, a water absorbable polymer having an average particle diameter of 10 to 50 µm was used as the pore former, methylcellulose was used as the organic binder, and dextrin was used as a dispersing agent.

Next, the kneaded material was extruded by using a predetermined die, to obtain a honeycomb formed body in which a cell shape was quadrangular and an overall shape was a round pillar shape. Additionally, during the extrusion, there was used an extruding die in which slits corresponding to a cross-sectional shape of the honeycomb formed body were formed, and in the extrusion, an extrusion speed was raised and an extrusion pressure was heightened as compared with after-mentioned extrusion in Comparative Example 1, to perform the formation.

Then, the honeycomb formed body was dried in a hot air drier. During the drying, ambient temperature was set at 95 to 145° C.

Next, the dried honeycomb formed body was fired, to prepare a honeycomb structure of Example 1. The ambient temperature during the firing was set at 1350 to 1440° C. and a firing time was set to 10 hours.

In the honeycomb structure of Example 1, a thickness of partition walls was 70 µm, and a cell density was 139.5 cells/cm$^2$. A cell shape in a cross section of the honeycomb structure which was perpendicular to an extending direction of cells was a quadrangle. Table 1 shows the thickness of the partition walls, the cell density, and the cell shape in column of "cell structure".

In the honeycomb structure of Example 1, a shape of a cross section perpendicular to an axial direction was a circle having a diameter of 105.7 mm, and a length (a total length) in the extending direction of the cells was 81.2 mm. Table 1 shows the shape of the honeycomb structure of Example 1 in columns of "cross-sectional shape", "diameter" and "total length".

As to the honeycomb structure of Example 1, "a porosity A of the partition wall in a partitioning wall portion between two cells 2" and "a porosity B of the partition wall in an intersecting portion connecting two or more wall portions" were measured by the following methods. Furthermore, an average porosity and a porosity ratio were obtained from values of the porosity A and the porosity B. The average porosity is a value of an arithmetic mean of the porosity A and the porosity B (i.e., (A+B)/2). The porosity ratio is a value of the porosity A to the porosity B (i.e., A/B). Table 2 shows the respective results.

(Measuring Method of Porosity)

First, a sample piece for which the porosity A and the porosity B were to be measured was cut out from the honeycomb structure. Respective regions from which the sample pieces were to be cut out were five regions on each of a first end face side (e.g., an inflow end face side) and a second end face side (e.g., an outflow end face side) of the honeycomb structure, i.e., ten regions in total. As regions to be cut out in each end face, there were considered a central position (a first region) of each end face, and four intermediate points (second to fifth regions) between the central position and a circumferential edge of the honeycomb structure on X-axis and Y-axis which passed this central position and were perpendicular to each other. The sample piece for which the porosity A was to be measured was cut out from each of the above-mentioned ten regions so as to include a central portion of the partitioning wall portion between two cells. A length of one side of the sample piece for which the porosity A was to be measured was considered as a thickness of the wall portion constituting the partition wall, a length of another side thereof was adjusted to 100 μm in an extending direction of the partition walls in each end face, and a length of still another side thereof was adjusted to 20 mm in the extending direction of the cells. The sample piece for which the porosity B was to be measured was cut out from each of the above-mentioned ten regions so as to include a central portion of the intersecting portion of the partition wall. The sample piece for which the porosity B is to be measured is considered as an end face of a square in which a length of one side is adjusted to 100 μm, taking the central portion of the intersecting portion as its center, and a length of the sample piece in an axial direction is adjusted to 20 mm in the extending direction of the cells 2. Next, the prepared sample piece was embedded in an epoxy resin to harden, and then its surface was polished. Then, each sample piece was cut outside as much as 5 mm in a total length direction, and its cut surface was observed in a SEM to acquire a SEM image. As the scanning electron microscope, "model No.: S3200-N" manufactured by Hitachi High-Technologies Corporation was used. During the measurement of the porosity A, the SEM image enlarged to 100 times was acquired as to the central portion of the partition wall in each observation surface of the ten sample pieces. Furthermore, during the measurement of the porosity B, the SEM image enlarged to 100 times was acquired as to the intersecting portion of the partition wall in each observation surface of the above-mentioned ten sample pieces. Afterward, as to each image, "an area S1 of the partition wall" and "an area S2 of a pore portion (a void portion)" were calculated by using an image analysis software, and the porosity of the imaged partition wall of each image was calculated in accordance with "Formula (1): $S2/(S1+S2)$". As values of S1 and S2, average values of porosities of the respective ten regions were used.

TABLE 2

| | Porosity (%) | | | |
|---|---|---|---|---|
| | Porosity A (wall portion) | Porosity B (intersecting portion) | Average porosity [(A + B)/2] | Porosity ratio [A/B] |
| Example 1 | 17.2 | 22.9 | 20.1 | 0.75 |
| Example 2 | 25.0 | 31.0 | 28.0 | 0.81 |
| Example 3 | 20.0 | 26.0 | 23.0 | 0.77 |
| Example 4 | 29.8 | 36.3 | 33.1 | 0.82 |
| Example 5 | 21.1 | 29.2 | 25.2 | 0.72 |
| Example 6 | 31.0 | 39.2 | 35.1 | 0.79 |
| Example 7 | 25.7 | 28.3 | 27.0 | 0.91 |
| Example 8 | 36.1 | 39.9 | 38.0 | 0.90 |
| Example 9 | 14.5 | 23.3 | 18.9 | 0.62 |
| Example 10 | 25.1 | 28.9 | 27.0 | 0.87 |
| Example 11 | 23.2 | 25.2 | 24.2 | 0.92 |
| Example 12 | 31.0 | 39.2 | 35.1 | 0.79 |
| Example 13 | 22.5 | 26.6 | 24.6 | 0.85 |
| Example 14 | 33.3 | 36.6 | 35.0 | 0.91 |
| Example 15 | 18.3 | 30.8 | 24.6 | 0.59 |
| Example 16 | 33.0 | 37.0 | 35.0 | 0.89 |
| Example 17 | 23.0 | 26.0 | 24.5 | 0.88 |
| Example 18 | 33.0 | 37.2 | 35.1 | 0.89 |
| Example 19 | 22.9 | 30.1 | 26.5 | 0.76 |
| Example 20 | 35.0 | 41.1 | 38.1 | 0.85 |

Examples 2 to 20

A cell structure, a cross-sectional shape and a porosity A and a porosity B of partition walls were changed as shown in Table 1 and Table 2, to prepare honeycomb structures of Examples 2 to 20. As to Examples 5, 6, 13 and 14, a cell shape was a hexagon. Furthermore, as to Examples 7 and 8, a cross-sectional shape of the honeycomb structure was an ellipse.

As to Examples 19 and 20, silicon carbide (SiC) was used as a material to prepare the honeycomb structure. The

TABLE 1

| | | Cell structure | | | | | | | |
|---|---|---|---|---|---|---|---|---|---|
| | Material | Thickness of partition walls (μm) | Cell density (cells/cm$^2$) | Cell shape | Cross-sectional shape | Diameter (mm) | Long diameter (mm) | Short diameter (mm) | Total length (mm) |
| Example 1 | Cordierite | 70 | 139.5 | Quadrangle | Circle | 105.7 | — | — | 81.2 |
| Example 2 | Cordierite | 70 | 139.5 | Quadrangle | Circle | 105.7 | — | — | 81.2 |
| Example 3 | Cordierite | 90 | 93 | Quadrangle | Circle | 129 | — | — | 100.0 |
| Example 4 | Cordierite | 90 | 93 | Quadrangle | Circle | 129 | — | — | 100.0 |
| Example 5 | Cordierite | 115 | 62 | Hexagon | Circle | 118.4 | — | — | 118.0 |
| Example 6 | Cordierite | 115 | 62 | Hexagon | Circle | 118.4 | — | — | 118.0 |
| Example 7 | Cordierite | 88 | 93 | Quadrangle | Ellipse | — | 228.6 | 137.2 | 152.4 |
| Example 8 | Cordierite | 88 | 93 | Quadrangle | Ellipse | — | 228.6 | 137.2 | 152.4 |
| Example 9 | Cordierite | 65 | 93 | Quadrangle | Circle | 93 | — | — | 110.0 |
| Example 10 | Cordierite | 65 | 93 | Quadrangle | Circle | 93 | — | — | 110.0 |
| Example 11 | Cordierite | 90 | 62 | Quadrangle | Circle | 105.7 | — | — | 95.0 |
| Example 12 | Cordierite | 90 | 62 | Quadrangle | Circle | 105.7 | — | — | 95.0 |
| Example 13 | Cordierite | 92 | 93 | Hexagon | Circle | 110 | — | — | 100.0 |
| Example 14 | Cordierite | 92 | 93 | Hexagon | Circle | 110 | — | — | 100.0 |
| Example 15 | Cordierite | 68 | 139.5 | Quadrangle | Circle | 129 | — | — | 95.0 |
| Example 16 | Cordierite | 68 | 139.5 | Quadrangle | Circle | 129 | — | — | 95.0 |
| Example 17 | Cordierite | 115 | 62 | Quadrangle | Circle | 266.7 | — | — | 200.0 |
| Example 18 | Cordierite | 115 | 62 | Quadrangle | Circle | 266.7 | — | — | 200.0 |
| Example 19 | SiC | 165 | 46.5 | Quadrangle | Circle | 143.8 | — | — | 127.0 |
| Example 20 | SiC | 165 | 46.5 | Quadrangle | Circle | 143.8 | — | — | 127.0 | honeycomb structure of each of Examples 19 and 20 was a honeycomb structure of a segmented structure.

During preparation of the honeycomb structures of Examples 2 to 20, an extrusion pressure during extrusion was adjusted, and values of a porosity A and a porosity B of partition walls were adjusted.

As to the honeycomb structures of Examples 1 to 20, evaluations on "thermal shock resistance (robustness)" were performed by the following method. Table 3 shows the results.

(Thermal Shock Resistance (Robustness))

Figure 8:
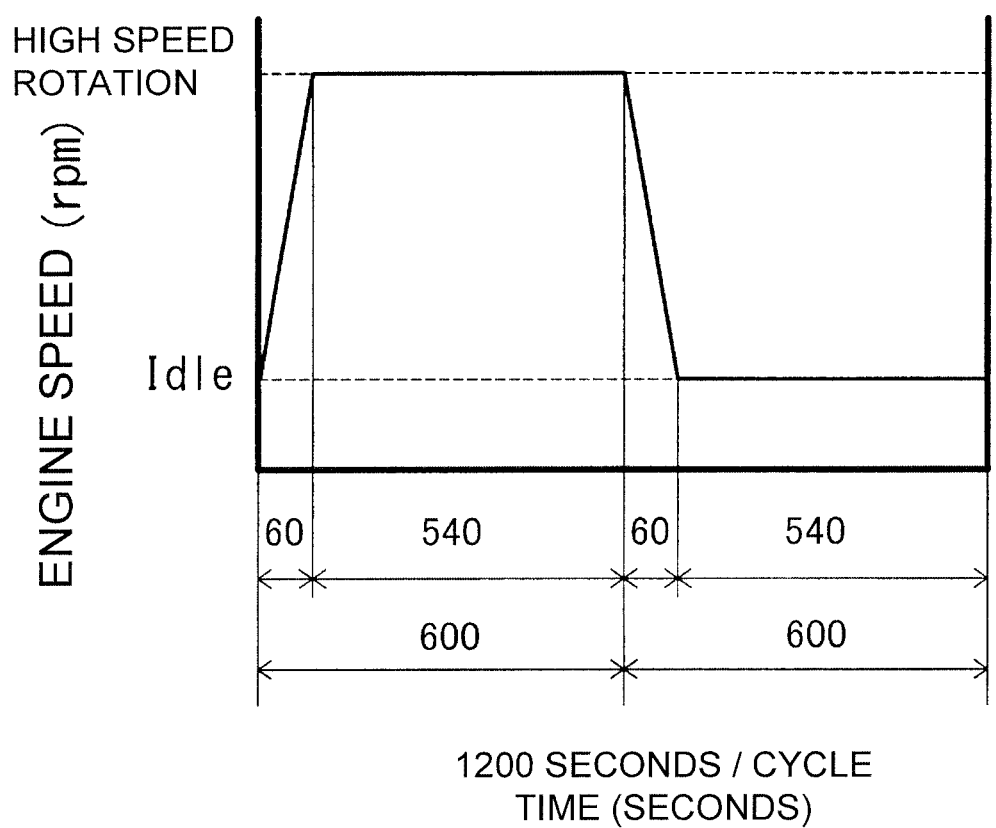
FIG. 8 is a graph showing a relation between an operation time (second) of an engine and an engine speed (rpm) in a test of a thermal shock resistance.

Each honeycomb structure held and housed in a metal can was connected to an exhaust port of a gasoline engine including four cylinders in series and having a displacement of 2.0 liters. Additionally, in evaluation of a thermal shock resistance, a three-way catalyst was loaded in a loading amount of 150 g/L onto the honeycomb structure of each of the examples and comparative examples. Then, a sample of the honeycomb structure as a carrier onto which the three-way catalyst was loaded was connected directly under the engine. Next, as shown in FIG. 8, the engine was operated on conditions that engine high speed rotation and idling were repeated. At this time, in each example, a temperature was adjusted so that a carrier temperature of a central portion at a position of 5 mm of the honeycomb structure on an inlet side was from the highest temperature at 1050° C. to the lowest temperature at 100° C. Additionally, on the highest temperature side, the engine high speed rotation was regulated to perform the temperature adjustment, and on the lowest temperature side, air was introduced during cooling to perform the temperature adjustment. This operation of the engine for 20 minutes was considered as a cycle, and this operation was repeated as much as 300 cycles, to carry out a test of a thermal shock resistance. As to each comparative example, the test was carried out on conditions that an engine speed was adjusted to the engine speed of the example denoted with the same number and that an amount of air to be introduced during the cooling was adjusted to the amount of the example denoted with the same number. After end of the test, the metal can was removed from the gasoline engine. Afterward, the honeycomb structure that was the carrier was also removed from the metal can, to visually observe the presence/absence of cracks in "the wall portion of the partition wall" and "the intersecting portion". As to confirmation for the presence/absence of the cracks, all regions of an inflow end face where the temperature heightened most were confirmed in the above-mentioned test. Then, the thermal shock resistance was evaluated on the basis of the following evaluation standards. Table 3 shows respective observation results of each wall portion of the partition walls and respective observation results of each intersecting portion of the partition walls. Here, FIG. 8 is a graph showing a relation between an operation time (second) of the engine and an engine speed (rpm) in the test of the thermal shock resistance.

Evaluation A: there are not any cracks.
Evaluation C: cracks are present.

Furthermore, in the evaluation of the thermal shock resistance, a comprehensive judgment was carried out on the basis of the evaluation results of the above-mentioned two portions by the following method. Table 3 shows the results. It is to be noted that in this comprehensive judgment, Evaluation A is considered as passing and Evaluation C is considered as a failure.

Evaluation A; there are not any cracks in both of the wall portion and the intersecting portion of each partition wall.

Evaluation C: there are cracks in at least one of the wall portion and the intersecting portion of each partition wall.

TABLE 3

|  | Thermal shock resistance (robustness) | | |
| --- | --- | --- | --- |
|  | Wall portion | Intersecting portion | Comprehensive judgment |
| Example 1 | A | A | A |
| Example 2 | A | A | A |
| Example 3 | A | A | A |
| Example 4 | A | A | A |
| Example 5 | A | A | A |
| Example 6 | A | A | A |
| Example 7 | A | A | A |
| Example 8 | A | A | A |
| Example 9 | A | A | A |
| Example 10 | A | A | A |
| Example 11 | A | A | A |
| Example 12 | A | A | A |
| Example 13 | A | A | A |
| Example 14 | A | A | A |
| Example 15 | A | A | A |
| Example 16 | A | A | A |
| Example 17 | A | A | A |
| Example 18 | A | A | A |
| Example 19 | A | A | A |
| Example 20 | A | A | A |

Comparative Examples 1 to 22

A cell structure, a cross-sectional shape and a porosity A and a porosity B of partition walls were changed as shown in Table 4 and Table 5, to prepare honeycomb structures of Comparative Examples 1 to 22. Also as to the honeycomb structures of Comparative Examples 1 to 22, the procedure of Example 1 was repeated to evaluate "thermal shock resistance (robustness)". Table 6 shows the results.

Additionally, as to Comparative Examples 5, 6, 13 and 14, a cell shape was formed as a hexagon. Furthermore, as to Comparative Examples 7 and 8, a cross-sectional shape of the honeycomb structure was formed as an ellipse. As to Comparative Examples 19 and 20, silicon carbide (SiC) was used as a material to prepare the honeycomb structure. Each of the honeycomb structures of Comparative Examples 19 and 20 was a honeycomb structure of a segmented structure. The honeycomb structures of Comparative Examples 1 to 20 had the same structure as in the honeycomb structures of Examples 1 to 20 denoted with the corresponding numbers, except that values of a porosity A and a porosity B were different. In addition, each of the honeycomb structures of Comparative Examples 21 and 22 was a honeycomb structure of the same structure (a quadrangular cell shape) as in the honeycomb structure of Comparative Example 1, except that values of a porosity A and a porosity B were different. In addition, the above mentioned thermal shock resistance (robustness) of each of the honeycomb structures of Comparative Examples 21 and 22 was measured under the same conditions as in Example 1.

TABLE 4

| | Material | Cell structure Thickness of partition walls (μm) | Cell density (cells/cm²) | Cell shape | Cross-sectional shape | Diameter (mm) | Long diameter (mm) | Short diameter (mm) | Total length (mm) |
|---|---|---|---|---|---|---|---|---|---|
| Comparative Example 1 | Cordierite | 70 | 139.5 | Quadrangle | Circle | 105.7 | — | — | 81.2 |
| Comparative Example 2 | Cordierite | 70 | 139.5 | Quadrangle | Circle | 105.7 | — | — | 81.2 |
| Comparative Example 3 | Cordierite | 90 | 93 | Quadrangle | Circle | 129 | — | — | 100.0 |
| Comparative Example 4 | Cordierite | 90 | 93 | Quadrangle | Circle | 129 | — | — | 100.0 |
| Comparative Example 5 | Cordierite | 115 | 62 | Hexagon | Circle | 118.4 | — | — | 118.0 |
| Comparative Example 6 | Cordierite | 115 | 62 | Hexagon | Circle | 118.4 | — | — | 118.0 |
| Comparative Example 7 | Cordierite | 88 | 93 | Quadrangle | Ellipse | — | 228.6 | 137.2 | 152.4 |
| Comparative Example 8 | Cordierite | 88 | 93 | Quadrangle | Ellipse | — | 228.6 | 137.2 | 152.4 |
| Comparative Example 9 | Cordierite | 65 | 93 | Quadrangle | Circle | 93 | — | — | 110.0 |
| Comparative Example10 | Cordierite | 65 | 93 | Quadrangle | Circle | 93 | — | — | 110.0 |
| Comparative Example11 | Cordierite | 90 | 62 | Quadrangle | Circle | 105.7 | — | — | 95.0 |
| Comparative Example12 | Cordierite | 90 | 62 | Quadrangle | Circle | 105.7 | — | — | 95.0 |
| Comparative Example13 | Cordierite | 92 | 93 | Hexagon | Circle | 110 | — | — | 100.0 |
| Comparative Example14 | Cordierite | 92 | 93 | Hexagon | Circle | 110 | — | — | 100.0 |
| Comparative Example15 | Cordierite | 68 | 139.5 | Quadrangle | Circle | 129 | — | — | 95.0 |
| Comparative Example16 | Cordierite | 68 | 139.5 | Quadrangle | Circle | 129 | — | — | 95.0 |
| Comparative Example17 | Cordierite | 115 | 62 | Quadrangle | Circle | 266.7 | — | — | 200.0 |
| Comparative Example18 | Cordierite | 115 | 62 | Quadrangle | Circle | 266.7 | — | — | 200.0 |
| Comparative Example19 | SiC | 165 | 46.5 | Quadrangle | Circle | 143.8 | — | — | 127.0 |
| Comparative Example20 | SiC | 165 | 46.5 | Quadrangle | Circle | 143.8 | — | — | 127.0 |
| Comparative Example21 | Cordierite | 70 | 139.5 | Quadrangle | Circle | 105.7 | — | — | 81.2 |
| Comparative Example22 | Cordierite | 70 | 139.5 | Quadrangle | Circle | 105.7 | — | — | 81.2 |

TABLE 5

| | Porosity (%) | | | |
|---|---|---|---|---|
| | Porosity A (wall portion) | Porosity B (intersecting portion) | Average porosity [(A + B)/2] | Porosity ratio [A/B] |
| Comparative Example 1 | 19.9 | 20.1 | 20.0 | 0.99 |
| Comparative Example 2 | 27.8 | 28.2 | 28.0 | 0.99 |
| Comparative Example 3 | 24.1 | 21.9 | 23.0 | 1.10 |
| Comparative Example 4 | 32.8 | 33.2 | 33.0 | 0.99 |
| Comparative Example 5 | 25.3 | 24.5 | 24.9 | 1.03 |
| Comparative Example 6 | 35.5 | 34.7 | 35.1 | 1.02 |
| Comparative Example 7 | 26.8 | 27.3 | 27.1 | 0.98 |
| Comparative Example 8 | 38.8 | 39.1 | 39.0 | 0.99 |
| Comparative Example 9 | 10.3 | 27.0 | 18.7 | 0.38 |
| Comparative Example10 | 15.6 | 38.3 | 27.0 | 0.41 |
| Comparative Example11 | 15.0 | 33.3 | 24.2 | 0.45 |
| Comparative Example12 | 21.0 | 49.2 | 35.1 | 0.43 |
| Comparative Example13 | 24.3 | 24.7 | 24.5 | 0.98 |
| Comparative Example14 | 34.8 | 35.3 | 35.1 | 0.99 |
| Comparative Example15 | 24.3 | 24.8 | 24.6 | 0.98 |
| Comparative Example16 | 34.8 | 35.2 | 35.0 | 0.99 |
| Comparative Example17 | 14.0 | 35.0 | 24.5 | 0.40 |
| Comparative Example18 | 20.3 | 49.8 | 35.1 | 0.41 |

TABLE 5-continued

| | Porosity (%) | | | |
|---|---|---|---|---|
| | Porosity A (wall portion) | Porosity B (intersecting portion) | Average porosity [(A + B)/2] | Porosity ratio [A/B] |
| Comparative Example19 | 26.4 | 26.7 | 26.6 | 0.99 |
| Comparative Example20 | 37.8 | 38.2 | 38.0 | 0.99 |
| Comparative Example21 | 41.0 | 47.0 | 44.0 | 0.87 |
| Comparative Example22 | 41.0 | 41.3 | 41.2 | 0.99 |

TABLE 6

| | Thermal shock resistance (robustness) | | |
|---|---|---|---|
| | Wall portion | Intersecting portion | Comprehensive judgment |
| Comparative Example 1 | C | A | C |
| Comparative Example 2 | C | A | C |
| Comparative Example 3 | C | A | C |
| Comparative Example 4 | C | A | C |
| Comparative Example 5 | C | A | C |
| Comparative Example 6 | C | A | C |
| Comparative Example 7 | C | A | C |
| Comparative Example 8 | C | A | C |
| Comparative Example 9 | A | C | C |
| Comparative Example10 | A | C | C |
| Comparative Example11 | A | C | C |
| Comparative Example12 | A | C | C |
| Comparative Example13 | C | A | C |
| Comparative Example14 | C | A | C |
| Comparative Example15 | C | A | C |
| Comparative Example16 | C | A | C |
| Comparative Example17 | A | C | C |
| Comparative Example18 | A | C | C |
| Comparative Example19 | C | A | C |
| Comparative Example20 | C | A | C |
| Comparative Example21 | C | C | C |
| Comparative Example22 | C | C | C |

(Result)

The honeycomb structures of Examples 1 to 20 could obtain the result of "Evaluation A" which satisfied criteria for passing in the comprehensive judgment of the thermal shock resistance. Specifically, in the honeycomb structures of Examples 1 to 20, any cracks were not generated in both of the wall portion and the intersecting portion of the partition wall in the evaluation of the thermal shock resistance.

The honeycomb structures of Comparative Examples 1 to 22 had the result of "Evaluation C" indicating a failure in the comprehensive judgment of the thermal shock resistance. Specifically, in the honeycomb structures of Comparative Examples 1 to 22, cracks were generated in at least one of the wall portion and the intersecting portion of the partition wall in the evaluation of the thermal shock resistance A honeycomb structure of the present invention is utilizable as a catalyst carrier onto which a catalyst for exhaust gas purification is to be loaded.

DESCRIPTION OF REFERENCE NUMERALS 1, 21 and 41: partition wall, 2, 22 and 42: cell, 3 and 43: circumferential wall, 4, 24 and 44: honeycomb structure body, 11, 31 and 51: first end face, 12 and 52: second end face, 15 and 35: intersecting portion, 16 and 36: wall portion, 46: honeycomb segment, 47: bonding layer, and 100, 200, 300 and 400: honeycomb structure.

What is claimed is:

1. A honeycomb structure comprising a honeycomb structure body having porous partition walls arranged to surround a plurality of cells which extend from a first end face to a second end face and become through channels for a fluid,
    wherein a value of a porosity of the porous partition walls in a partitioning wall portion between two cells of the plurality of cells is defined as a porosity A,
    a thickness of the porous partition walls is from 40 to 115 µm,
    a value of a porosity of the porous partition walls in an intersecting portion that is a region connecting two or more partitioning wall portions is defined as a porosity B,
    a value of A/B obtained by dividing the porosity A by the porosity B is from 0.5 to 0.95,
    the porosity A is from 10 to 40%, and
    the porosity B is from 20 to 37.2%.

2. The honeycomb structure according to claim 1, wherein an arithmetic mean of the porosity A and the porosity B is from 15 to 45%.

3. The honeycomb structure according to claim 1, wherein a shape of the plurality of cells in a cross section of the honeycomb structure body which is perpendicular to an extending direction of the plurality of cells is quadrangular or hexagonal.

* * * * *